United States Patent Office 3,639,601
Patented Feb. 1, 1972

3,639,601
BACTERIOSTAT AND FUNGISTAT COMPOSITIONS CONTAINING CYCLIC O,N-ACETALS
Rudolph Junghahnel, Witten-Bommern, and Gustav Renckhoff and Klaus Thewalt, Witten (Ruhr), Germany, assignors to Dynamit Nobel Aktiengesellschaft, Troisdorf, Germany
No Drawing. Filed July 16, 1968, Ser. No. 745,110
Claims priority, application Germany, July 20, 1967, D 53,634
Int. Cl. A01n 9/22; A61l 1/00
U.S. Cl. 424—244                                    7 Claims

ABSTRACT OF THE DISCLOSURE

The use of N-acylated cyclic O,N-acetals as bacteriostats and fungistats. Used alone or with a carrier, they are effective in inhibiting the growth of bacteria and fungi. The acetals are especially effective against gram-positive bacteria.

BACKGROUND OF THE INVENTION

The present invention relates to the use of N-acylated cyclic O,N-acetals as bacteriostats and fungistats. More particularly, it relates to the use of said cyclic O,N-acetals as inhibitory compounds against gram-positive and gram-negative bacteria, as well as against various kinds of fungi.

It is known in the prior art to employ various chlorine or nitro derivatives, respectively, of oxazolidines and tetrahydro-oxazines as bacteriostats and fungistats, as for example in United States Patent 3,114,707 and in a treatise by M. Businelli and L. Serpien in "Il Farmaco Ed. sci." 10, 793 (1955). However, only a weak effectiveness is obtained with the described compounds.

SUMMARY OF THE INVENTION

One of the objects of the present invention is to provide a novel utilization for N-acylated cyclic O,N-acetals.

Another object of the present invention is to provide compositions containing said acetals which are useful as bacteriostats and fungistats.

A further object of the invention is to provide a method of effectively combating the growth of gram-positive and gram-negative bacteria and various kinds of fungi which may be effectuated in a relatively simple and direct manner.

These and other objects and advantages of the present invention will become apparent to those skilled in the art from a consideration of the following specification and claims.

In accordance with the present invention, it has been found that N-acylated cyclic O,N-acetals having the general formula

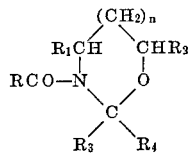

wherein $n$ is 0 or 1; R is an alkyl group of 5–11 carbon atoms; $R_1$ is hydrogen or $C_2H_5$; $R_2$ and $R_3$ are each H or $CH_3$; and $R_4$ is H, alkyl groups of 1–4 carbon atoms, or $C_6H_5$, exhibit surprisingly good bacteriostatic and fungistatic properties with respect to gram-positive and gram-negative bacteria, as well as against various kinds of fungi.

The novel compounds employed in the present invention can be categorized into two groups, i.e., the N-acyloxazolidines and the N-acyltetrahydro-1,3-oxazines. They can be prepared in accordance with the methods described in copending application Ser. No. 714,791, filed on Mar. 21, 1968, and application Ser. No. 724,629, filed on Apr. 26, 1968, respectively. Briefly, insofar as the N-acyloxazolidines are concerned, they are prepared by condensing an aliphatic or cycloaliphatic N-(2 - hydroxyethyl)-amide with an aldehyde or ketone. The N-acylated cyclic O,N-acetals are prepared by reacting an alkylolamide with an aldehyde or ketone in the presence of an acidic catalyst. Generally, these preparations are carried out in an inert organic solvent at a temperature of about 100–150° C., while removing the water of reaction from the reaction mixture azeotropically.

The following are examples of the preparation of the N-acyloxazolidines used in the present invention.

EXAMPLE 1

21.5 g. (0.1 mole) of capric acid-(2-hydroxyethyl)-amide, 13.5 g. of paraldehyde (0.3 mole of acetaldehyde) and 1 g. of butyl titanate are dissolved in 100 cc. of xylene and slowly heated with stirring with the use of a water trap until the boiling temperature of xylene is attained. The water split off in the reaction is distilled off azeotropically during this procedure. After refluxing for another hour, the reaction mixture is cooled, washed twice with water, filtered off, and, after the xylene has been distilled off, fractionated under vacuum. The yield is 13 g. of 2-methyl-N-caprinoyloxazolidine, a 54% theoretical yield; B.P.$_1$=96°–98° C.; $n_D^{20}$=1.4526.

EXAMPLE 2

21.5 g. (0.1 mole) of capric acid-(2-hydroxyethyl)-amide, 17.5 g. (0.3 mole) of propionaldehyde and 1 g. of p-toluenesulfonic acid are reacted in 200 ml. of xylene according to Example 1 and worked up. The yield is 16 g. of 2-ethyl-N-caprionoyloxazolidine; a yellow oil, B.P.$_2$=156°–158° C.; $n_D^{20}$=1.4648.

In an analogous manner, given merely for illustrative purposes, the following N-acyloxazolidines can be prepared from the listed reactants in accordance with the procedure of Example 2.

| Ex. | Reactants | Reaction product |
|---|---|---|
| 3 | 21.5 g. (0.1 mole) capric acid-(2-hydroxyethyl)- amide+21.6 g. (0.3 mole) butyraldehyde. | 13 g. of 2-propyl-N-caprinoyloxazolidine. |
| 4 | 86 g. (0.4 mole) capric acid-(2-hydroxyethyl)-amide+43.5 g. (0.6 mole) isobutyraldehyde. | 37 g. of 2-isopropyl-N-caprinoyloxazolidine. |
| 5 | 37.5 g. (0.2 mole) caprylic acid-(2-hydroxyethyl)-amide+29 g. (0.4 mole) isobutyraldehyde. | 23 g. of 2-isopropyl-N-octanoyloxazolidine. |
| 6 | 15.9 g. (0.1 mole) caproic acid-(2-hydroxyethyl)-amide+21.6 g. (0.3 mole) butyraldehyde. | 16. g. of 2-propyl-N-caproyloxazolidine. |

The following are examples of the preparation of the N-acyltetrahydro-1,3-oxazines used in the present invention.

EXAMPLE 7

175 g. (1 mole) of caproic acid-N-(2-hydroxypropyl)-amide
53 g. (1.75 mole) of p-formaldehyde
5 g. of toluenesulfonic acid
1 l. of xylene are agitated at 100–120° C. for 1 hour, and then refluxed for 1 hour; 18 ml. of water of reaction is obtained. The reaction mixture is cooled, taken up in ether and washed until neutral. Then, it is filtered over sodium sulfate and the solvent distilled off. The distillation of the residue on a small Vigreux column results in 141 g. of 5-methyl-N-hexanoyloxazolidine; B.P.$_2$=121–122° C.; $n_D^{20}$:1.4640. The amount obtained represents a 76.1% theoretical yield.

EXAMPLE 8

20 g. (0.1 mole) of caprylic acid-N-(2-hydroxypropyl)-amide
33 g. (0.25 mole) of paraldehyde
1 g. of butyl titanate
100 ml. of xylene are agitated at 100–120° C. for 1 hour, and then refluxed for 1 hour; 1.5 ml. of water of reaction is obtained. The reaction mixture is cooled, taken up in ether, and washed until neutral. Then, it is filtered over sodium sulfate and the solvent distilled off. The distillation of the residue on a small Vigreux column results in 6 g. of 2,5-dimethyl-N-octanoyloxazolidine (a 26% theoretical yield);

$$B.P._{0.1} = 78-80° C.$$

$n_D^{20}$: 1.4480.

In an analogous manner, given merely for illustrative purposes, the following N-acyltetrahydro-1,3-oxazines can be prepared from the listed reactants in accordance with the procedure of Example 7.

| Ex. | Reactants | Reaction product |
|---|---|---|
| 9 | Benzoic acid-N-(2-hydroxypropyl)-amide (0.1 mole) plus paraformaldehyde (0.18 mole). | 5-methyl-N-benzoyloxazolidine. |
| 10 | Caprylic acid-N-(2-hydroxypropyl)-amide (0.1 mole) plus paraformaldehyde (0.18 mole). | 5-methyl-N-octanoyloxazolidine. |
| 11 | Propionic acid-N-(2-hydroxypropyl)-amide (0.1 mole) plus caproic aldehyde (0.3 mole). | 2-pentyl-5-methyl-N-propionyloxazolidine. |
| 12 | Capric acid-N-(2-hydroxypropyl)-amide (0.1 mole) plus i-butyraldehyde (0.3 mole). | 2-isopropyl-5-methyl-N-decanoyloxazolidine. |

The experiments in accordance with the present invention were conducted according to the following methods:

(1) The detection of bacteriostatic and fungistatic effects was conducted with the aid of dilution tests along the lines of the regulations set up by the "Deutsche Gesellschaft für Hygiene und Mikrobiologie" (German Society for Hygiene and Microbiology) for the testing of chemical disinfectants.

(2) The growth test was conducted in accordance with DIN Preliminary Standard 53,931.

(3) The detection of the effect against blue mold genera was conducted with the aid of the modified DIN Preliminary Standard 53,931 (dissolving the disinfectants in a 1:1 mixture of linseed oil-stand oil-white spirits and using *Pullularia pullulans* as the test fungus).

The effectiveness of the compounds utilized in accordance with the present invention against gram-positive bacteria (*Staphylococcus aureus*) is stronger than against gram-negative ones (*Bacterium coli*). The tests conducted show that the effective concentration against gram-positive bacteria is below 0.012% by weight in the case of the following compounds:

N-lauroyloxazolidine
N-decanoyloxazolidine
N-lauroyl-tetrahydro-1,3-oxazine.

The effective concentration against gram-negative bacteria is below 0.3% by weight in the case of the following compounds:

N-decanoyloxazolidine
2,5-dimethyl-n-octanoyloxazolidine
N-octanoyl-2-phenyl-tetrahydro-1,3-oxazine.

Against molds (*Aspergillus niger*), inhibitory concentrations below 0.06% by weight result in the case of the following compounds:

2-methyl-3-decanoyloxazolidine
N-caproyloxazolidine
N-decanoyloxazolidine
5-methyl-N-decanoyloxazolidine
2,5-dimethyl-2-isobutyl-N-decanoyloxazolidine
5-methyl-N-octanoyloxazolidine
N-decanoyl-tetrahydro-1,3-oxazine
N-octanoyl-tetrahydro-1,3-oxazine
N-oxazolidine of the preliminary run of coconut acids (mixture of fatty acids derived from the hydrolysis of coconut oil)
4-ethyl-N-decanoyloxazolidine
4-ethyl-N-octanoyloxazolidine.

A 3% coating of the following preparations on nettle fabric exhibited a growth-inhibitory effect against molds (*Aspergillus niger*):

N-decanoyloxazolidine
5-methyl-N-decanoyloxazolidine
5-methyl-N-octanoyloxazolidine
N-isononyl-5-methyloxazolidine
N-octanoyl-tetrahydro-1,3-oxazine
N-undecenoyl-5-methyloxazolidine
4-ethyl-N-octanoyloxazolidine.

In linseed oil-stand oil-white spirits (ratio of dilution 1:1), the following compound exhibits a satisfactory effectiveness against blue molds when a concentration of 4% thereof is employed:

2,5-dimethyl-2-isobutyl-N-decanoyloxazolidine.

It is to be understood that the above specific examples of preparations of compounds in accordance with the present invention are given merely as illustrative of the present invention and are not to be considered as limiting. Unless otherwise noted, the percentages throughout the application are by weight.

Thus, it is to be understood that not all of the compounds utilized herein are effective to the same degree. Accordingly, changes in concentration may readily be made by one skilled in the art as the situation warrants.

Hence, it is apparent that the compounds utilized in the present invention may be applied per se or they may be used as a bacteriostat and fungistat composition comprising an effective amount of the described O,N-acetals and an inert carrier. Suitable inert carriers include, for example, aromatic hydrocarbon solvents, such as toluene or xylene. However, other suitable carriers may be employed as desired.

The invention being thus described, it will be obvious that the same may be varied in many ways. Such variations are not to be regarded as a departure from the spirit and scope of the invention, and all such modifications are intended to be included within the scope of the following claims.

We claim:

1. A process for inhibiting the growth of microorganisms selected from the group consisting of bacteria and fungi which comprises contacting said microorganisms with an effective bacteriostatic or fungistatic amount of an N-acylated cyclic O,N-acetal having the formula:

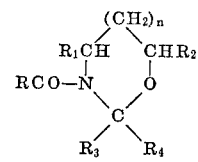

wherein $n$ is 0 or 1, R is alkyl of 5 to 11 carbon atoms, $R_1$ is H or $C_2H_5$, $R_2$ and $R_3$ are H or $CH_3$ and $R_4$ is H, alkyl of 1 to 4 carbon atoms or $C_6H_5$.

2. The process of claim 1, wherein said microorganisms are gram-positive bacteria and said acetal is selected from the group consisting of N-lauroyloxazolidine, N-decanoyloxazolidine and N-lauroyltetrahydro-1,3-oxazine.

3. The process of claim 1, wherein said microorganisms are gram-negative bacteria and said acetal is selected from the group consisting of N-decanoyloxazolidine, 2,5-dimethyl-n-octanoyloxazolidine and N-octanoyl-2-phenyl-tetrahydro-1,3-oxazine.

4. The process of claim 1, wherein said microorganisms are molds and said acetal is selected from the group consisting of 2-methyl-3-decanoyloxazolidine, N-caproyloxazolidine, N - decanoyloxazolidine, 5 - methyl-N-decanoyloxazolidine, 2,5 - dimethyl - 2 - isobutyl-N-decanoyloxazolidine, 5-methyl-N-octanoyloxazolidine, N-decanoyltetrahydro - 1,3 - oxazine, N-octanoyl-tetrahydro-1,3-oxazine, 4-ethyl-N-decanoyloxazolidine and 4-ethyl-N-octanoyloxazolidine.

5. A process for inhibiting the growth of bacteria and fungi on nettle fabric which comprises coating said fabric with an effective bacteriostatic or fungistatic amount of an N-acylated cyclic O,N-acetal having the formula:

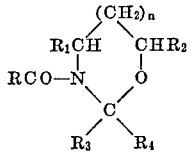

wherein $n$ is 0 or 1, R is alkyl of 5 to 11 carbon atoms, $R_1$ is H or $C_2H_5$, $R_2$ and $R_3$ are H or $CH_3$ and $R_4$ is H, alkyl of 1 to 4 carbon atoms or $C_6H_5$.

6. A bacteriostat and fungistat composition comprising an effective bacteriostatic and fungistatic amount of an N-acylated cyclic O,N-acetal having the formula:

wherein $n$ is 0 or 1, R is alkyl of 5 to 11 carbon atoms, $R_1$ is H or $C_2H_5$, $R_2$ and $R_3$ are H or $CH_3$ and $R_4$ is H, alkyl of 1 to 4 carbon atoms or $C_6H_5$, and a hydrocarbon solvent.

7. The composition of claim 6, wherein said hydrocarbon solvent is toluene or xylene.

References Cited
UNITED STATES PATENTS

| | | | |
|---|---|---|---|
| 2,964,530 | 12/1960 | Zenitz | 260—307.6 |
| 3,114,707 | 12/1963 | Hodge | 424—248 |
| 3,281,310 | 10/1966 | Danielson | 260—244 |

ALBERT T. MEYERS, Primary Examiner

V. D. TURNER, Assistant Examiner

U.S. Cl. X.R.

424—248; 117—138.5